June 4, 1946.　　　J. D. BENBOW ET AL　　　2,401,407
HOPPER BOTTOM CAR AND TRAILER
Original Filed Aug. 16, 1937　　6 Sheets-Sheet 3
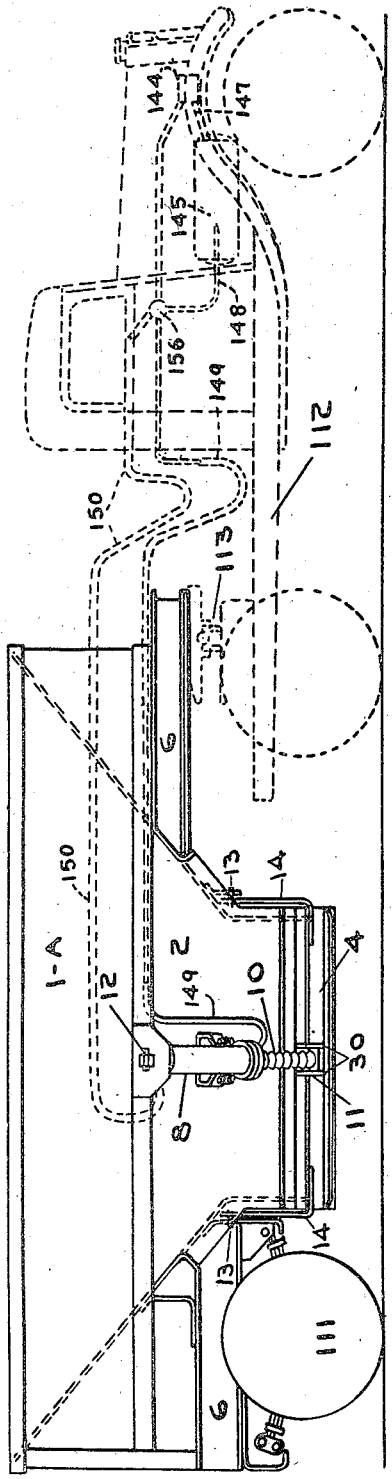
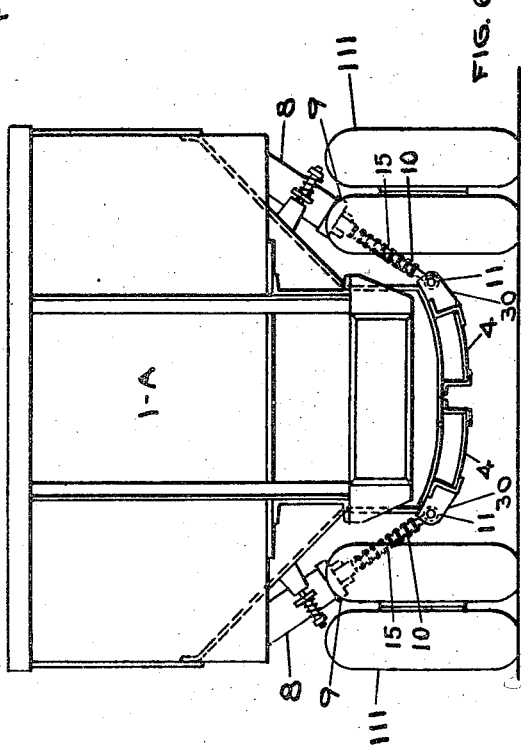
INVENTORS
James D Benbow
George W Sines
BY James D Benbow INVENTORS
James D. Benbow
George W. Sines
BY James D. Benbow

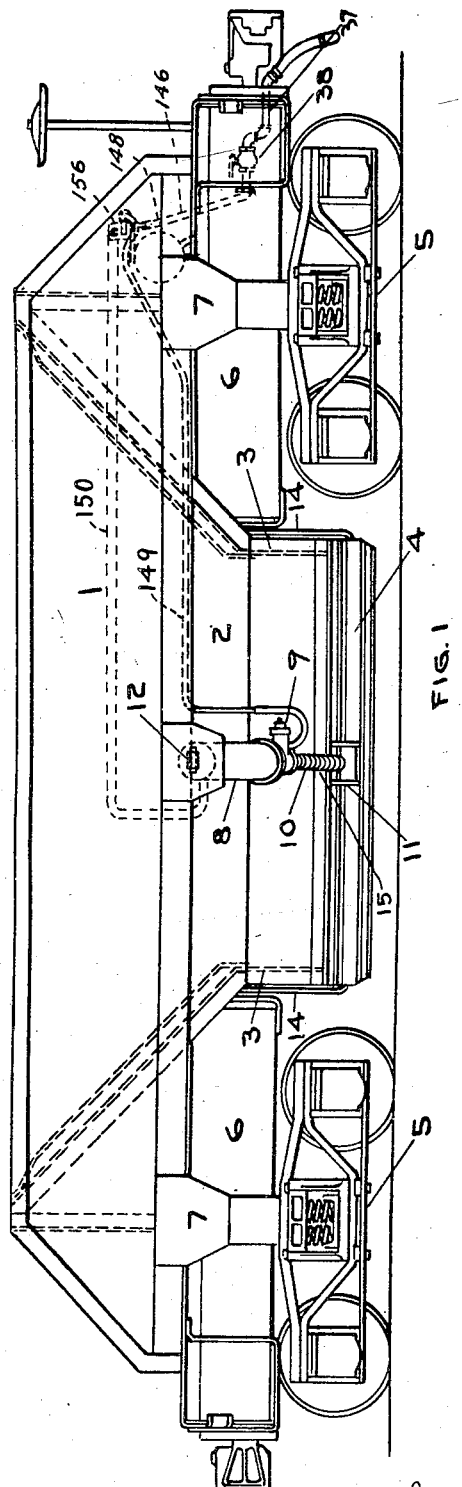

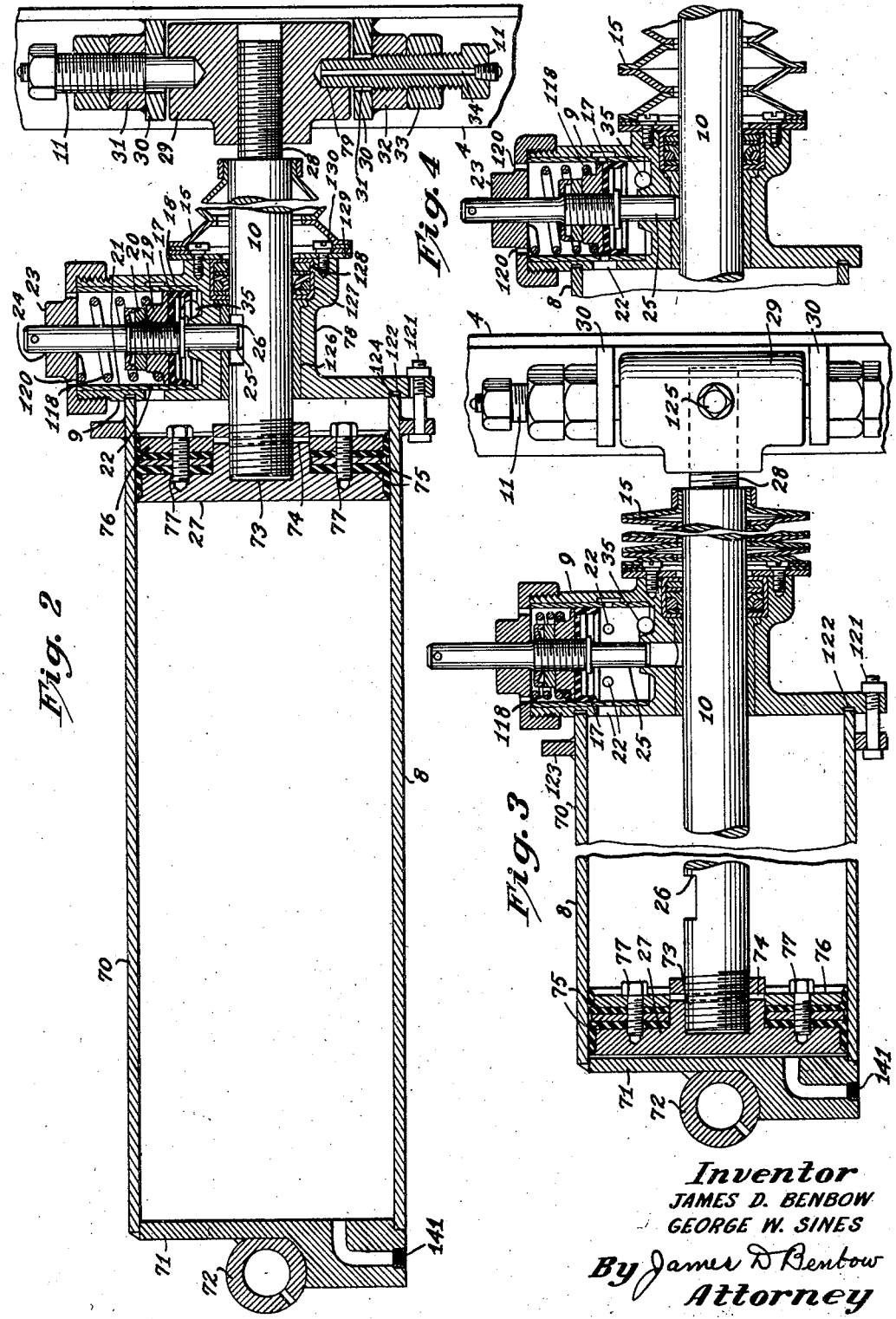

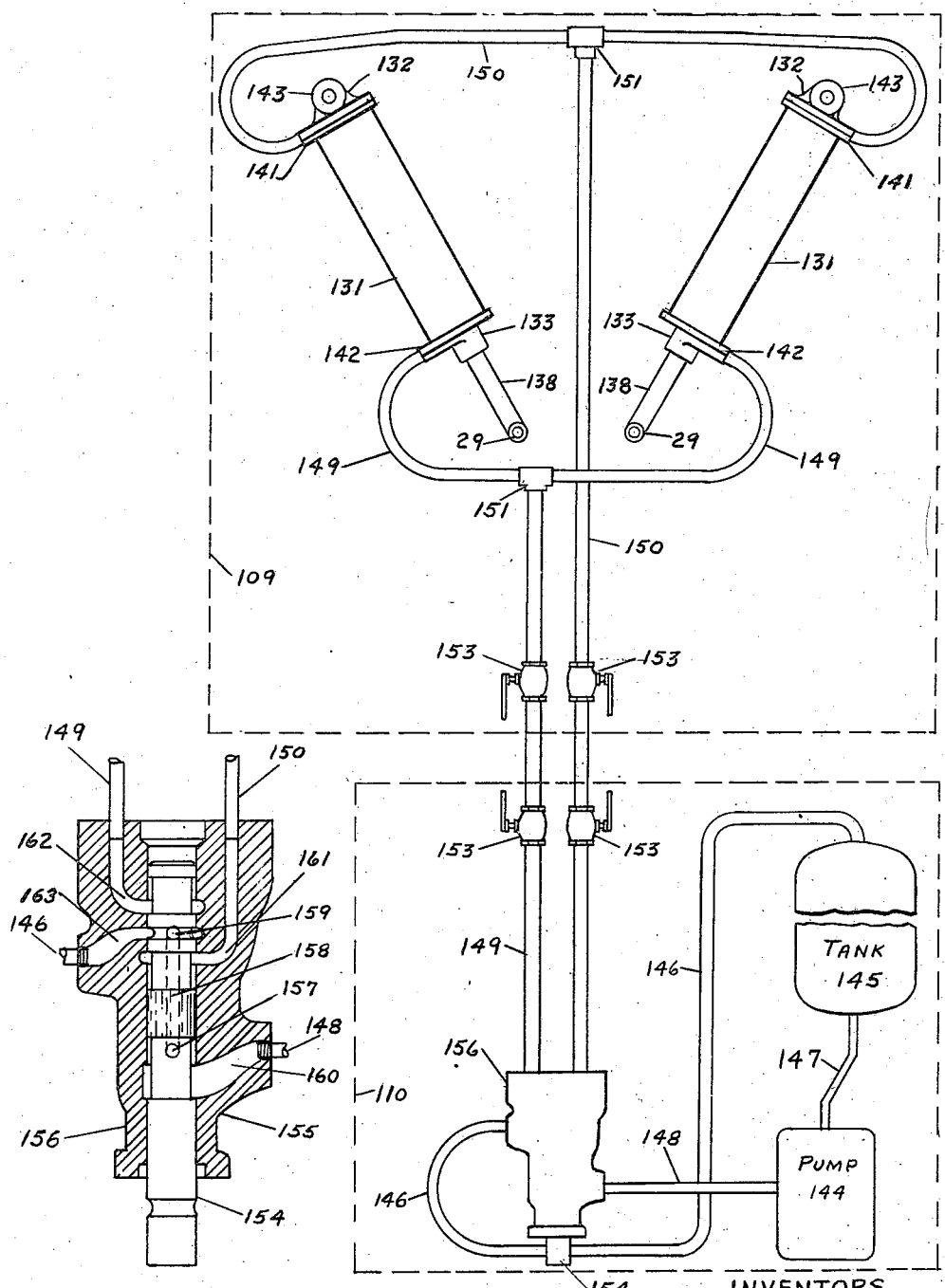

Patented June 4, 1946

2,401,407

UNITED STATES PATENT OFFICE 2,401,407

HOPPER BOTTOM CAR AND TRAILER

James D. Benbow and George W. Sines, Aurora, Ill., assignors to Austin-Western Company, a corporation of Illinois Original application August 16, 1937, Serial No. 159,225. Divided and this application April 7, 1941, Serial No. 387,318

6 Claims. (Cl. 298—35)

Our present invention is a divisional application of our co-pending application, Serial No. 159,225 (now Patent No. 2,237,299, dated April 8, 1941), filed August 16, 1937, and relates particularly to hopper type cars with bottom discharge doors mounted on railway trucks for operation on rails, and hopper containers or trailers mounted on wheels with or without rubber tires for operation on roads and pulled by tractor trucks, in which the doors or gates are controlled by air or any other fluid pressure.

In the mining industry, coal mining in particular, the opening and closing of the doors or gates, when dumping the load into a hopper or onto a belt conveyor located under the track on which the cars operate, has been accomplished by mechanical means at the discharge point, and the car or the hopper container mounted on rubber tires could not be used to haul refuse or gob on the return trip to the mines and deposit it where the ore or coal had been removed, as it has been necessary to have the mechanical means located at the place of dumping when returning the refuse or gob to the mines, which is impracticable because the location of the dump is constantly changing. Our invention permits the opening and closing of the doors or gates at any desired place, thus increasing the usefulness of the hopper car and hopper container or trailer mounted on rubber tires.

Also, sometimes while using the hopper cars and trailers it is desirable to open the doors gradually and allow the contents to be distributed while the hopper car or trailer is moving. This is true when the hopper cars are hauling track ballast and when the trailers are used to build roads or dams. In our co-pending application (now Patent No. 2,237,299, dated April 8, 1941) we, among other features, describe a hopper bottom car and trailer embodying double acting pistons mounted in two-way controlled cylinders for opening and closing, and holding the doors in open and closed position, and it is in this way that we accomplish the above result.

In the drawings only one pair of doors is shown. However, any number of doors can be used and operated as described.

One of the objects of this invention is to provide means to control the amount of opening of the doors; in other words, to partly open the doors or to open them to the full opening.

Another object of this invention is to provide a cylinder having a double acting piston, which permits the use of fluid pressure on both sides of the piston, and by releasing the pressure on one side of the piston and applying pressure on the opposite side, we are able to control the amount of door opening.

Another object of this invention is to provide means to retain fluid pressure on both sides of the piston and hold the door in any desired position, and thus control the amount of door opening.

Another object of our invention is to provide means whereby the air or fluid pressure means must first unlock the doors or gates before the air or fluid pressure is applied to the door opening means.

Another object of this invention is to provide means for hand unlocking or power unlocking of the doors before pressure can be applied to the fluid pressure cylinders which open the doors.

Another object of our invention is to provide mechanical locking means to lock the doors in a closed position and fluid pressure means to unlock the doors before fluid pressure can be applied to the cylinders which open the doors.

Another object of this invention is to control the opening and closing of the doors to permit the contents of the hopper body to be distributed over a greater or less area, as in building roads it is desired to spread the earth or gravel in thin layers and pack each layer before applying the next layer, which is accomplished by gradual door opening.

Another object of our invention is to provide means whereby the opening of the doors may be controlled to distribute the hopper contents of gravel, earth, ore or coal in stock piles.

Further objects of this invention are to provide a construction of maximum simplicity, efficiency, economy and ease of assembly and operation, and such further objects, advantages and capabilities as will later more fully appear and are inherently possessed thereby.

The invention further resides in the combination, construction and arrangement of parts illustrated in the accompanying drawings and, while we have shown therein a preferred embodiment, it is to be understood that the same is susceptible of modification and change without departing from the spirit of our invention.

In the drawings:

Figure 1 is a side elevation of a hopper car mounted on standard railroad trucks.

Figure 2 is a cross section of one of the cylinders when the doors are in locked position.

Figure 3 is a cross section of one of the cylinders when the doors are in open position.

Figure 4 is a cross section of the door locking valve when the air, or fluid pressure, is being exhausted.

Figure 5 is a side elevation of the hopper, or container mounted on wheels or rubber tires and a tractor truck for operation on roads.

Figure 6 is a rear view of the hopper, or container, mounted on rubber tires, showing the doors in a closed position.

Figure 13 is a diagrammatic drawing of the double acting pistons and a control means.

Figure 14 is a cross section of a hydraulic control valve.

Figure 7:
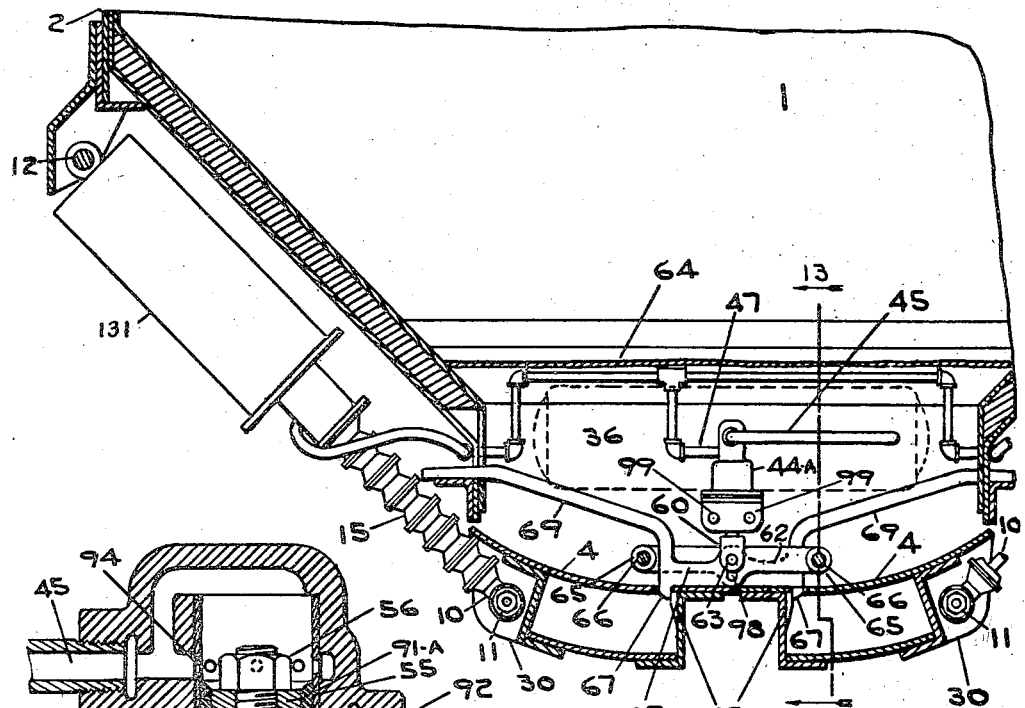
Figure 7 illustrates another means for locking the doors in a closed position.

Referring to the drawings, the car hopper and underframe 1, having sides 2, ends 3 and doors 4, are supported on the draft-beams 6 and bolsters 7 by trucks 5, which may be of any suitable design for operation on rails of any desirable track gauge.

Doors 4 are supported and carried by arms 14 which are attached to each end of doors 4 and are hung from the ends 3 by pins 13, which permits the oscillation of doors 4 for the opening and closing of the bottom of the hopper 1. The opening and closing of doors 4 is accomplished by cylinders 8 or 131 which are attached to the sides 2 by pins 12. Piston rods 10 of cylinder 8 are attached to the doors 4 by pins 11.

Referring to Figures 2, 3 and 4, which are cross sections of the cylinder 8 and its component parts, the piston rod 10 of cylinder 8 is covered by an accordion type boot 15 which prevents dirt or other foreign matter from accumulating on piston rod 10. Cylinder 8 has a body 70 to which is welded the upper head 71 and pin bearing 72 thru which pins 12 attach the cylinder 8 to the body or sides 2. Piston rod 10 is attached to piston 27 by the threaded portion 73 of the piston rod 10 and is prevented from turning, after being screwed in place in piston 27, by pin 74. Packing cups 75 are applied to piston 27 and held in place by piston follower 76 and cap screws 77. The piston rod 10 has groove 26 which is engaged by lock pin or piston rod 25 of valve 9 to hold the doors 4 in a closed or locked position. The lower portion or cylinder head 78 has a groove 122 to receive gasket 124 and body 70 of cylinder 8 and is bolted by bolts 121 to flange 123 of cylinder 8. Cylinder head 78 contains the valve 9 and also has brass bushing 126 and leather air or oil seal 127 and dirt seal 128, which are held in place by plate 129 with tap screws 130, and is used as a guide for the piston rod 10. The lower portion 28 of piston rod 10 is threaded to receive a T-shaped tapped nut 29 having holes 79 to receive pins 11, the T-shaped nut 29 being tapped to receive the lower threaded portion 28 of piston rod 10, which provides adjustment for wear as well as adjustment for the length of the stroke of piston rod 10. Set screw 125 is provided to prevent the turning of T-shaped nut 29 on the lower threaded portion 28 of piston rod 10.

The valve 9 in the lower portion or cylinder head 78 consists of a lock pin or piston rod 25 which is upset and threaded to receive washer 17 and packing cup 18 which are held together by nut 19 and lock nut 20. Tube 21 is pressed in the body of valve 9 and has a series of holes 22 in the periphery of the tube to permit air to flow from the inlet 35 thru the series of holes 22 into cylinder 8. When air or any other fluid pressure means is admitted to the cylinder 8 thru valve 9 at the inlet 35, it moves the lock pin or piston rod 25 of valve 9 outward in guide nut 23 thru hole 24, compressing spring 118 and unlocking the piston rod 10 of cylinder 8 as shown in Figure 3. The air or any other fluid pressure means is then free to flow thru the holes 22 into the body of the cylinder 8 and will cause the piston 27 and piston rod 10 to move upward to the position shown in Figure 3. When air or any other fluid pressure is released from the inlet 35 of the valve 9, lock pin or piston rod 25 and spring 118 of the valve 9 return to the position shown in Figure 4 and the air or any other fluid pressure means is released from the lower part of cylinder 8 thru the holes 22 and into the atmosphere thru the holes 120 of the nut 23 or return thru inlet 35. The piston 27 and piston rod 10 are thus permitted to return the doors 4 to the normal position very quickly and the spring 118 moves lock pin or piston rod 25 to engage the piston rod 10 as shown in Figure 2, which is the locked or closed position of the doors 4.

The doors 4 have projections 30 each with a threaded portion 32 to receive the threaded pin 11 with adjusting nut 33, which prevents the rotation of pin 11 but allows the T-shaped nut 29 to oscillate on each of the pins 11. Pins 11 are provided with an Alemite fitting and a hole 34 full length thereof to oil or grease the end of pins 11 which engage the T-shaped nut 29 in the recessed hole 79. Other methods of adjusting the length of the piston rod 10 can be used and one within the scope of our claims.

Figures 8, 9:
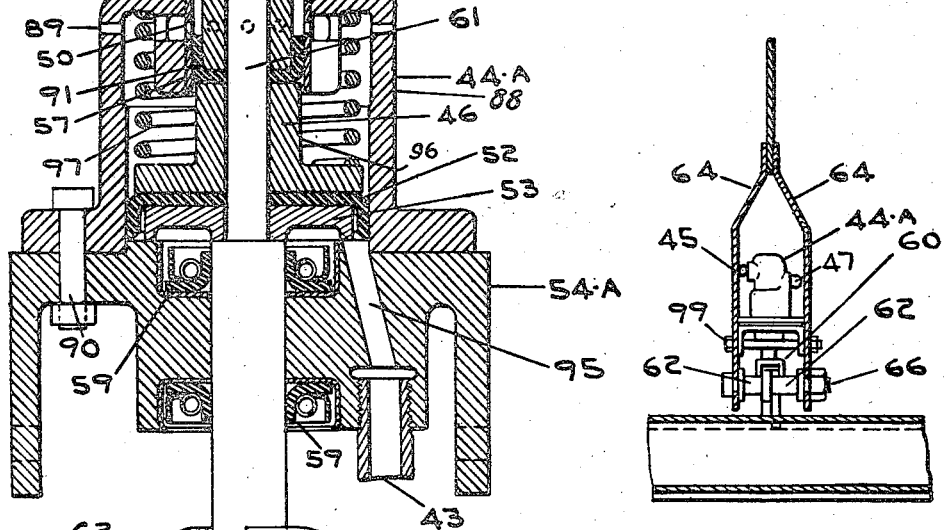
Figure 8 is a partial cross section taken on line 13—13 of Fig. 7.
Figure 9 is a cross section of the door locking and unlocking valve shown in Figure 7.
Figure 11:
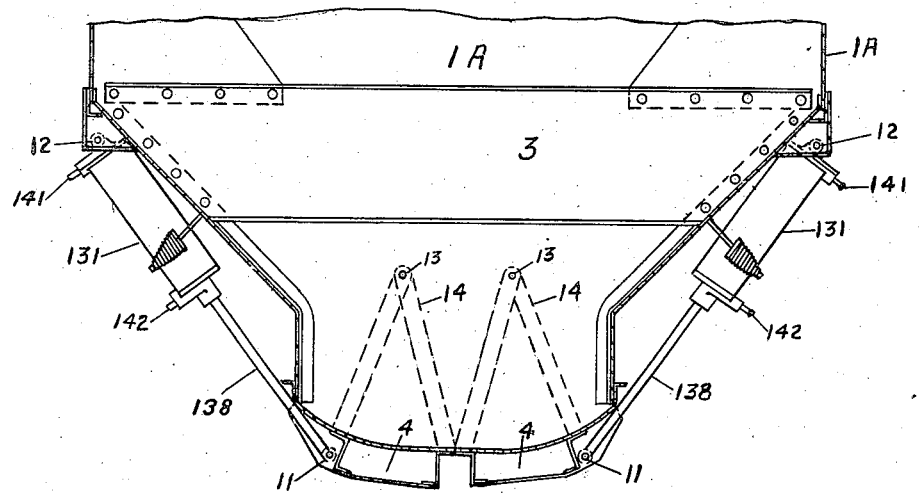
Figure 11 is a cross section of the car or trailer showing doors held closed by the double acting cylinder pistons.

Referring to Figures 7, 8 and 9, which illustrate another method of locking and unlocking the doors 4, automatic valve 44—A, a cross section of which is shown in Figure 9, is similarly constructed to automatic valve 44 shown in Figure 11 in our copending application (now Patent No. 2,237,299). Referring to Figure 9 the automatic valve 44—A consists of a body 88 and bottom head 54—A having inlet 45 and outlet 47 and exhaust ports or holes 89. The bottom head 54—A is attached to the valve body 88 by bolts 90. The complete piston 96 consists of packing follower 53, packing cup 52 and spacer 46, packing cup 91 and spacer 92, packing cup 91—A and washer 55, which are connected by piston rod 61 and nut 56, forming one unit (piston 96) for movement in the valve body 88. Valve body 88 has brass tube 57 pressed therein and has three series of holes 50, 93 and 94 located in the periphery thereof. The inlet 45 is connected to the control valve 156. The lower part of piston rod 61 of the automatic valve 44—A extends thru leather, oil or air seals 59 in the lower head 54—A and has the jaw 60 attached for operating a door locking and unlocking mechanism as shown in Figures 7, 8 and 9. Automatic valve 44—A is located between the two partition plates 64 (see Figs. 7 and 8) and fastened thereto by bolts 99 which pass thru the lower portion 54—A of automatic valve 44—A. The door locking arms 62 are attached to the partition plates 64 at ends 65 by pins 66, which permits the oscillation of the door locking arms 62 for locking and unlocking doors 4. Door locking arms 62 have vertical slotted holes 98 and they are attached to bolt 61 at jaws 60 by pin 63. The door locking arms 62 have projections 67 which engage the doors 4 at the lugs 68 which are provided for adjustment for wear. Door locking arms 62 are provided with extensions 69 which project thru the sides 2 to permit manual unlocking of the doors 4 should some part of the automatic valve 44—A fail to operate.

Figures 5 and 6 show the hopper container 1—A mounted on rubber tires 111 and supported by truck 112 at the oscillating fifth wheel 113. Figure 6 is a rear view of Figure 5 and shows the location of the doors 4 and the door mechanism in reference to the hopper container 1—A and the tires 111. The parts which are similar to the hopper car 1 shown in Figure 1 are given the same reference numbers and the opening and closing of the doors 4 are accomplished by the cylinders 8 in a similar manner to the opening and closing of the doors 4 in the hopper car 1 mounted on railroad trucks 5.

From the description it can readily be seen that it is impossible to admit air or other fluid pressure to the cylinders until the door locking mechanism has unlocked the doors. Also, this mechanism can be separate from the cylinders or can be embodied in the cylinders. When the door locking mechanism is a part of the cylinders, each door can be locked and unlocked independently of the other, thus permitting one door to open and the other to remain closed, or both to open at one time.

In our co-pending application, Serial No. 159,225, (now Patent No. 2,237,299) on page 12 of the specification we describe how other means, such as oil pressure, could be used to apply power on both sides of the piston 27 of the cylinder 8 to open and close the doors 4 and hold them in a locked position. Figures 10, 11, 12, 13 and 14 show in more detail how this can be accomplished.

Figure 12:
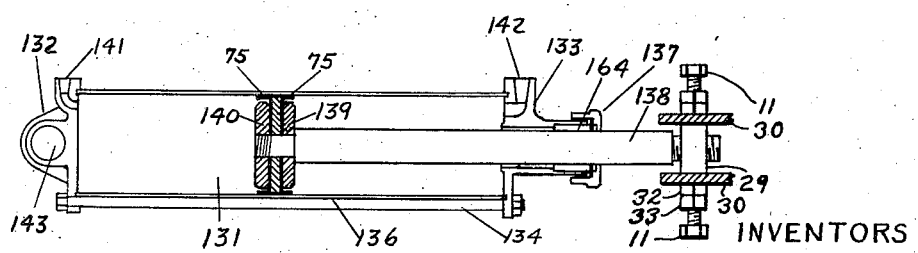
Figure 12 is a cross section of the cylinder showing the double acting pistons.

Referring to Figure 12, this is a cross section of cylinder 131 with double acting pistons 139 and 140 having two packing cups 75 placed back to back and held together by the piston rod 138, which has its upper portion threaded and screwed into the upper part of piston 140 and the lower portion threaded to receive adjustable nut 29. The upper and lower cylinder heads 132 and 133 are held in position with the cylinder body 136 by several rods 134, which have a head on one end and a nut on the other. The upper and lower cylinder heads 132 and 133 could also be fastened by bolts to the cylinder body 136, as shown in Figures 2 and 3. The cylinder heads 132 and 133 have openings 141 and 142 to permit oil or other fluid to flow into the cylinder 131, and the lower cylinder head 133 has the usual packing 164 and an adjustable cap 137 threaded and screwed on the lower cylinder head 133 for adjusting and holding the packing 164 in place.

Figure 10:
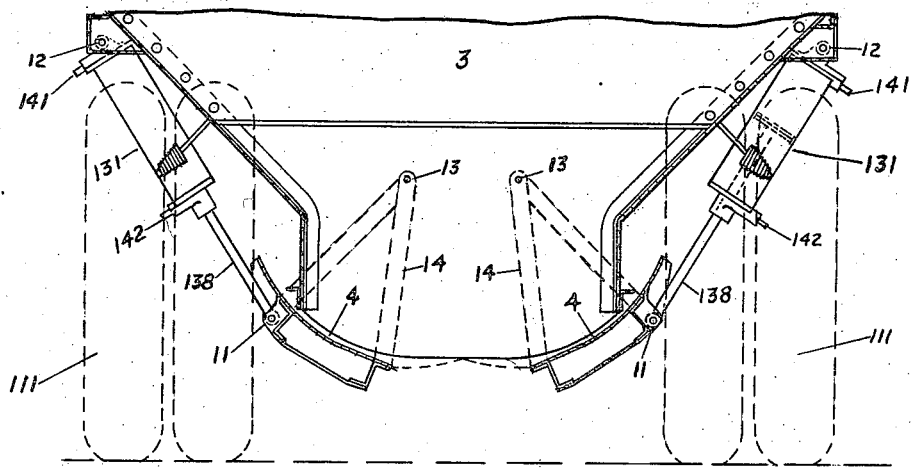
Figure 10 is a cross section of the car or trailer showing doors partly opened by the double acting cylinder pistons.

Referring to Figures 10 and 11, the upper cylinder head 132 is provided with a circular hole 143 for mounting on the car 1 or the container 1—A by pin 12, and the lower end of the piston rod 138 is connected to the door 4 by the pin 11 and adjustable T-shaped nut 29, as shown on Figures 2 and 12.

Referring to Figures 12, 13 and 14, Figure 14 is a cross section of a conventional type of hydraulic valve with the valve stem 154 in the neutral position, which permits the fluid to flow from the pump 144 into the pipe 148, thru opening 160 of the valve body 155, on thru openings 157 and 158 to opening 159 of the valve stem 154, thru opening 163 of the valve body 155 to pipe 146 and to tank 145; thus relieving the pressure on the pump 144.

By moving the valve stem 154 inward in the valve body 155 until the opening 159 coincides with the opening 162 in the valve body 155, the oil will then flow from the pump 144 to pipe 148 and opening 160 in the valve body 155, then thru openings 157, 158, 159 and 162, and pipe 149, thru opening 142 of the cylinder head 133; thus forcing the pistons 139 and 140 and piston rod 138 (see Figure 12) upward, opening the doors 4. When the desired door opening is reached, the valve stem 154 is returned to neutral position as shown in Figure 14.

By moving the valve stem 154 outward until opening 159 coincides with opening 161, the pump 144 then forces the oil, or any other fluid, thru pipe 148 thru opening 160 of valve body 155, thru openings 157, 158, 159 and 161, thru pipe 150 to the upper cylinder head 132, thru openings 141 and into cylinders 131, applying pressure to the upper end of pistons 139 and 140 and causing the piston rod 138 to move downward and close the doors 4. At the same time, the pressure being relieved from the under side of the pistons 139 and 140, the fluid will flow from the cylinder 131 thru the openings 142 and pipe 149, thru the control valve 156, thru openings 162 and 163 of the valve body 155, thru pipe 146 to the tank 145. Thus it can be seen that by moving the valve stem 154 of the control valve 156 into a neutral position, as shown in Figure 14, while the door is partly open or partly closed, the amount of door opening can be controlled by the operator. By proper manipulation of valve stem 154 of the control valve 156, we can retain pressure on both sides of the pistons 139 and 140 (Figure 12) and control the amount of door opening, as well as hold the door in a closed position by releasing the pressure on the under side of the pistons 139 and 140 of the cylinder 131 and applying the pressure to the upper end of the cylinder 131 and on the pistons 139 and 140.

Also, as explained above, by the proper manipulation of control valve 156 the doors 4 can be gradually opened, that is, move the valve stem 154 slowly in the direction desired to secure the door opening needed and return the valve stem 154 to the neutral position, thus keeping the pressure on both sides of the piston 139 and 140, and we are able to permit any amount of the hopper contents to be released and thereby, by controlling the amount of door opening and the speed of the car 1 or container 1—A, we can control the thickness of the material applied to the ground and spread gravel in ballasting the track or dirt in building roads or dams.

Referring to Figure 13, we can substitute cylinder 8 as shown in Figures 2 and 3 having double acting pistons instead of single acting pistons and an inlet at the upper end, instead of cylinder 131 as shown in Figure 13.

By using control valve 156 and air for fluid pressure, and assuming the doors to be closed, we admit air to the lower side of cylinder 8 thru opening 35, which will first move the unlocking mechanism and permit the air to flow thru opening 22 to the lower side of the piston. By moving the valve 156 to release position, the air will flow back thru holes 22 and out to the atmosphere thru holes 120. Thus by the use of control valve 156 with the above combination, air can be admitted to either side of said double acting pistons. Also, by quick operation of said control valve 156, air can be admitted to both sides, and by release of the air from one side and holding the air in the opposite side, you can control the door opening and closing and the amount of door opening.

When the door is in a closed position, the spring will cause the automatic locking mechanism to assume the position shown in Figure 2. If we substitute oil for air, it is only necessary to move the inlet 22 toward the piston rod to permit the oil to flow back thru hole 22 and out thru hole 35, which is equivalent to 142 in Figure 13. By admitting the oil thru 35 in Figure 2, or 142 in Figure 13, the locking mechanism will unlock and the oil will flow thru opening 22 into the lower side of the cylinder and cause the piston to move upward and open the doors. The oil can be admitted to the opposite end by use of the control valve 156 and pressure can be maintained on both sides of said double acting pistons to control the amount of door opening.

From the description of the invention, it is readily seen that other combinations may be made without departing from the spirit of the invention.

We claim:

1. A hopper bottom container with bottom openings and doors to close said openings, means to support and move said hopper bottom container, in combination, a self-propelled unit with operator's station thereon connected to said hopper bottom container, fluid pressure cylinders with double acting pistons and piston rods mounted therein mounted on said container, one end of said piston rods pivotally connected to said doors, automatic locking means to lock and hold said doors in a closed position and fluid pressure unlocking means mounted on said container, fluid pressure control means mounted in said operator's station having fluid pressure connection to said fluid pressure unlocking means and to the upper and lower sides of said double acting pistons of said fluid pressure cylinders to control the unlocking, opening, closing and locking of said doors.

2. A hopper bottom container with bottom openings and doors to close said openings, means to support and move said hopper bottom container, in combination, a self-propelled unit with operator's station thereon connected to said hopper bottom container, fluid pressure cylinders with double acting pistons and piston rods mounted therein mounted on said container, one end of said piston rods pivotally connected to said doors, automatic locking means to lock and hold said doors in a closed position and fluid pressure unlocking means mounted on said container, fluid pressure control means mounted in said operator's station having fluid pressure connection to said fluid pressure unlocking means and to the upper and lower sides of said double acting pistons of said fluid pressure cylinders to control the application of fluid pressure to the unlocking means and to the lower side as well as the release of fluid pressure from the upper side of the double acting pistons in said fluid pressure cylinders to open and hold said doors in any desired position.

3. In a hopper container having bottom discharge doors, in combination, supporting means for said hopper container for movement over the road, a tractor truck connected to and supporting one end of said hopper bottom container supporting means, fluid pressure cylinders with piston rods and double acting pistons mounted therein mounted on said hopper bottom container, one end of said piston rods connected to said doors, fluid pressure unlocking means and automatic locking means mounted on said container and contacting said doors to hold said doors in a closed position, fluid pressure control means mounted on said tractor truck to control the admission of fluid pressure to said unlocking means and to either side of said double acting pistons of said fluid pressure cylinders to open and control the amount of openings of the said doors.

4. A hopper bottom container with bottom openings and means to support and move said hopper bottom container, in combination, discharge doors pivotally mounted on said hopper bottom container to close said bottom openings, fluid pressure cylinders with piston rods and double acting pistons mounted therein mounted on said hopper bottom container, said piston rods being adjustably and pivotally connected to said discharge doors, control means to control the admission of fluid pressure to the lower end of said cylinders and pistons and at the same time release the fluid pressure from the upper ends of said cylinders and pistons, and vice versa, to open and close said doors and control the amount of door opening.

5. In a hopper container, in combination, supporting means for said hopper container for movement over the road, tractor truck connected to said hopper container supporting means, said hopper container having swingable bottom discharge doors, fluid pressure cylinders with piston rods and double acting pistons mounted therein mounted on said hopper container, said piston rods being adjustably and pivotally connected to said doors, fluid pressure control means mounted on said tractor to control the release of fluid pressure from the upper side and admit pressure to the lower side of said double acting pistons to open said doors and vice versa to close and hold said doors in a closed or any desired position to control the flow of material from said container.

6. In a railway hopper type car having swingable bottom discharge doors, in combination, fluid pressure cylinders with piston rods and double acting pistons mounted therein mounted on said hopper container, said piston rods being adjustably and pivotally connected to said doors, fluid pressure control means to control the release of fluid pressure from the upper side and admit pressure to the lower side of said double acting pistons to open said doors and vice versa to close and hold said doors in a closed or any desired position to control the flow of material from said container.

JAMES D. BENBOW.
GEORGE W. SINES.